(12) United States Patent
Shin et al.

(10) Patent No.: US 6,770,335 B2
(45) Date of Patent: Aug. 3, 2004

(54) PHOTOALIGNMENT MATERIALS AND LIQUID CRYSTAL DISPLAY DEVICE AND METHOD FOR FABRICATING THE SAME WITH SAID MATERIALS

(75) Inventors: Hyun Ho Shin, Kyonggi-do (KR); Mi Sook Nam, Kyonggi-do (KR); Su Hyun Park, Kyonggi-do (KR); Moonhor Ree, Kyongsangbuk-do (KR); Seung Woo Lee, Taegu-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 275 days.

(21) Appl. No.: 09/946,624

(22) Filed: Sep. 6, 2001

(65) Prior Publication Data

US 2002/0054967 A1 May 9, 2002

(30) Foreign Application Priority Data

Oct. 28, 2000 (KR) ........................................ 2000-63685

(51) Int. Cl.[7] ............................................. G02F 1/1337
(52) U.S. Cl. ...................... 428/1.25; 428/1.2; 428/1.26; 428/474.4; 428/473.5; 349/123; 528/125; 528/128; 430/283.1; 430/286.1; 252/299.4
(58) Field of Search .................................. 428/1.2, 1.25, 428/1.26, 473.5, 474.4, 1.27; 349/123–124, 126; 528/125, 128, 182–184, 188, 353; 430/281.1, 283.1, 286.1; 252/299.4; 522/104

(56) References Cited

U.S. PATENT DOCUMENTS 3,030,208 A * 4/1962 Schellenberg et al. ...... 430/325
3,912,920 A    10/1975 Kubota
4,861,854 A * 8/1989 Sugio et al. ................. 528/125

(List continued on next page.)

FOREIGN PATENT DOCUMENTS

DE     44 20 585     12/1995
DE     197 03 682 A1    8/1997
EP     0 261 712 A1    3/1988

(List continued on next page.)

OTHER PUBLICATIONS

Active Matrix LCDs, WTEC Hyper–Librarian, Dec. 1994.*
J. L. West, et al., *Polarized UV–Exposed Polyimide Films for Liquid–Crystal Alignment*, SID 95 Digest, pp. 703–705.

(List continued on next page.)

*Primary Examiner*—Harold Pyon
*Assistant Examiner*—Sow-Fun Hon
(74) *Attorney, Agent, or Firm*—McKenna Long & Aldridge LLP

(57) ABSTRACT

Polyamideimide photoalignment materials having a photosensitive diamine derivative compound with side branches, and liquid crystal display devices using such a photoalignment material, beneficially as an alignment film. A liquid crystal display device includes a first substrate with such a photoalignment material. The polyamideimide photoalignment materials have a chemical structure as follows:

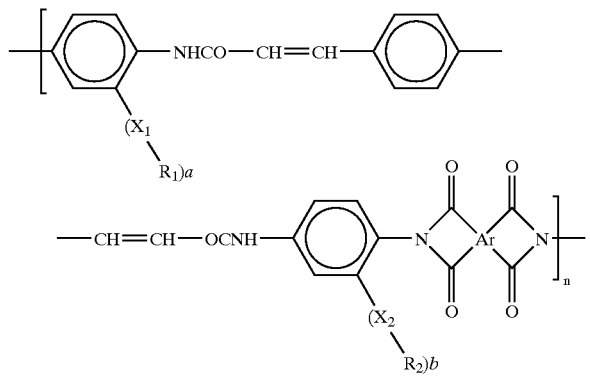

24 Claims, 1 Drawing Sheet

U.S. PATENT DOCUMENTS

| | | | |
|---|---|---|---|
| 4,963,448 A | 10/1990 | Ichimura et al. | |
| 4,974,941 A | 12/1990 | Gibbons et al. | |
| 5,032,009 A | 7/1991 | Gibbons et al. | |
| 5,073,294 A | 12/1991 | Shannon et al. | |
| 5,296,321 A | 3/1994 | Kawanishi et al. | |
| 5,350,539 A * | 9/1994 | Mishina et al. | 252/299.4 |
| 5,389,698 A | 2/1995 | Chigrinov et al. | |
| 5,447,662 A | 9/1995 | Herr et al. | |
| 5,453,862 A | 9/1995 | Toko et al. | |
| 5,464,668 A * | 11/1995 | Asaoka et al. | 428/1.25 |
| 5,464,669 A | 11/1995 | Kang et al. | |
| 5,479,282 A | 12/1995 | Toko et al. | |
| 5,538,823 A | 7/1996 | Park et al. | |
| 5,539,074 A | 7/1996 | Herr et al. | |
| 5,576,862 A | 11/1996 | Sugiyama et al. | |
| 5,578,351 A | 11/1996 | Shashidhar et al. | |
| 5,602,661 A | 2/1997 | Schadt et al. | |
| 5,604,615 A | 2/1997 | Iwagoe et al. | |
| 5,657,105 A | 8/1997 | McCartney | |
| 5,712,696 A | 1/1998 | Toko et al. | |
| 5,731,405 A * | 3/1998 | Gibbons et al. | 528/353 |
| 5,744,203 A * | 4/1998 | Harada et al. | 428/1.23 |
| 5,764,326 A | 6/1998 | Hasegawa et al. | |
| 5,767,994 A | 6/1998 | Kang et al. | |
| 5,784,139 A | 7/1998 | Chigrinov et al. | |
| 5,786,041 A | 7/1998 | Takenaka et al. | |
| 5,824,377 A | 10/1998 | Pirwitz et al. | |
| 5,853,818 A | 12/1998 | Kwon et al. | |
| 5,856,430 A | 1/1999 | Gibbons et al. | |
| 5,856,431 A | 1/1999 | Gibbons et al. | |
| 5,859,682 A | 1/1999 | Kim et al. | |
| 5,880,803 A | 3/1999 | Tamai et al. | |
| 5,882,238 A | 3/1999 | Kim et al. | |
| 5,889,571 A | 3/1999 | Kim et al. | |
| 5,909,265 A | 6/1999 | Kim et al. | |
| 5,982,466 A | 11/1999 | Choi et al. | |
| 6,084,057 A * | 7/2000 | Gibbons et al. | 528/353 |
| 6,340,506 B1 * | 1/2002 | Buchecker et al. | 428/1.26 |

FOREIGN PATENT DOCUMENTS

| | | |
|---|---|---|
| EP | 0 525 473 A2 | 2/1993 |
| EP | 0 525 478 A2 | 2/1993 |
| EP | 0 549 283 A2 | 6/1993 |
| EP | 0 611 786 A1 | 8/1994 |
| EP | 0 635 748 A1 | 1/1995 |
| EP | 0 690 334 A2 | 1/1996 |
| EP | 0 708 354 A1 | 4/1996 |
| EP | 0 742 471 A2 | 11/1996 |
| EP | 0 750 212 A2 | 12/1996 |
| EP | 0 788 012 A2 | 8/1997 |
| EP | 0 742 471 A3 | 10/1997 |
| GB | 2 309 793 | 8/1997 |
| GB | 2 309 794 | 8/1997 |
| GB | 2 317 964 A | 4/1998 |
| GB | 2 319 093 | 5/1998 |
| JP | 01-251344 | 10/1989 |
| JP | 01-251345 | 10/1989 |
| JP | 02-055330 A | 2/1990 |
| JP | 02-298917 | 12/1990 |
| JP | 03-036527 | 2/1991 |
| JP | 03-120503 | 5/1991 |
| JP | 03-241311 | 10/1991 |
| JP | 04-007520 | 1/1992 |
| JP | 04-284421 | 10/1992 |
| JP | 04-350822 | 12/1992 |
| JP | 05-019208 | 1/1993 |
| JP | 05-034699 | 2/1993 |
| JP | 05-053513 | 3/1993 |
| JP | 05-232473 | 9/1993 |
| JP | 07-056173 | 3/1995 |
| JP | 07-261185 | 10/1995 |
| JP | 07-318861 | 12/1995 |
| JP | 07-318942 | 12/1995 |
| JP | 08-334790 | 12/1996 |
| JP | 09-211465 | 8/1997 |
| JP | 09-211468 | 8/1997 |
| JP | 09-265095 | 10/1997 |
| JP | 09-318946 A | 12/1997 |
| JP | 10-090684 | 4/1998 |
| JP | 10-154658 A | 6/1998 |
| JP | 10-161126 A | 6/1998 |
| JP | 10-332932 A | 12/1998 |
| JP | 11-194344 | 7/1999 |
| JP | 11-194345 | 7/1999 |
| WO | WO 94/28458 | 12/1994 |
| WO | WO 95/18989 | 7/1995 |
| WO | WO 95/22075 | 8/1995 |
| WO | WO 95/34843 | 12/1995 |
| WO | WO 99/08148 | 2/1999 |

OTHER PUBLICATIONS

J. Chen, et al., *Investigation of the Mechanism of the Surface–Induced Alignment of Liquid Crystals by Linear Polymerized Photopolymers*, SID 95 Digest, pp. 528–531.

A Lien, et al., *UV Modification of Surface Pretilt of Alignment Layers for Multidomain Liquid Crystal Displays*, Applied Physics Letters 67 (21), Nov. 20, 1995, pp. 3108–3110.

W. M. Gibbons, et al., *Surface–Mediated Alignment of Nematic Liquid Crystals with Polarized Laser Light*, Nature, vol. 351, May 2, 1991, pp. 49–50.

M. Schadt, et al., *Surface–induced Parallel Alignment of Liquid Crystals by Linearly Polymerized Photopolymers*, Jpn. J. Appl. Phys., vol. 31 (1992), Part 1, No. 7, Jul. 1992, pp. 2155–2164.

Y. Iimura, et al., *Alignment Control of a Liquid Crystal on a Photosensitive Polyvinylalcohol Film*, Jpn. J. Appln. Phys., vol. 32 (1993), Part 2, No. 1A/B, Jan. 15, 1993, pp. sL93–L96.

J. Chen, et al., *Model of Liquid Crystal Alignment by Exposure to Linearly Polarized Ultraviolet Light*, Physical Review E, vol. 54, No. 2, Aug. 1996, pp. 1599–1603.

J. Chen, et al., *P–54: Mechanism of Liquid–Crystal Alignment by Polyimide Exposure to Linearly Polarized UV Light*, SID 96 Digest, pp. 634–637.

K.–W. Lee, et al., *LP–K: Late–News Poster: Mechanism of UV Modification of LC Pretilt Angle and Its Application to Two–Domain TN–LCDs*, SID 96 Digest, pp. 638–641.

J. H. Kim, et al., *LP–L: Late–News Poster: Photo–Alignment of Liquid Crystals Using a New Photopolymer*, SID 96 Digest, pp. 646–649.

Y. Saitoh, et al., *P–58: Stability of UV–Type Two–Domain Wide–Viewing Angle TFT–LCD Panels*, SID 96 Digest, pp. 662–665.

T. Yamaoto, et al., *P–55: Liquid–Crystal Alignment by Slantwise Irradiation of Non–Polarized US Sight on a Polyimide Layer*, SID 96 Digest, pp. 642–645.

M. Schadt, et al., *Optical Patterning of Multi–Domain Liquid–Crystal Displays with Wide Viewing Angles*, Nature, vol. 381, May 16, 1996, pp. 212–215.

M. Schadt, et al., *Photo–Generation of Linearly Polymerized Liquid Crystal Aligning Layers Comprising Novel, Integrated Optically Patterned Retarders and Color Filters*, Jpn. J. Appl. Phys., vol. 34 (1995), Part 1, No. 6A, Jun. 1995, pp. 3240–3249.

P.J. Shannon, et al., *Patterned Optical Properties in Photopolymerized Surface–Aligned Liquid–Crystal Films, Nature*, vol. 368, Apr. 7, 1994, pp. 532–533.

T. Marusil, et al., *Photosensitive Orientants for Liquid Crystal Alignment, Mol. Mat.*, 1993, vol. 3, pp. 161–168.

M. Hasegawa, et al., *Nematic Homogeneous Photo Alignment by Polyimide Exposure to Linearly Polarized UV, Journal of Photopolymer Science and Technology*, vol. 8, No. 2 (1995), pp. 241–248.

T. Hashimoto, et al., *41.4: TN–LCD with Quartered Sub-pixels Using Polarized UV–Light–Irradiated Polymer Orientation Films, SID 95 Digest*, pp. 877–880.

T. Saitoh, et al., *S23–4 A New Hybrid N–TB Mode LCD with Two Domain Pixels Fabricated Using a Photopolymer, Asia Display 95*, pp. 589–592.

H. S. Soh, et al., *19:1: The Realization of Wide Viewing Angle TFT–LCDs using Photo–Alignment Method, Euro Display 96*, pp. 579–583.

D.–S. Seo, et al., *44.1: Invited Address: Surface Alignment of Liquid Crystals in LCDs, SID 93 Digest*, pp. 953–956.

Y. Iimura, et al., *19:1: Invited Paper: Prospects of the Photo–Alignment Technique for LCD Fabrication, SID 97 Digest*, pp. 311–314.

R. Shashidhar, et al., *19.2: A New Non–Rubbing Technique for Liquid–Crystal Alignment, SID 97 Digest*, pp. 315–318.

M. Schadt, et al., *24:1: Invited Paper: Optical Patterning of Multidomain LCDs, SID 97 Digest*, pp. 397–400.

K.Y. Han, et al., *P–54: A Study on the Photo–Alignment of the Polymer–Containing Cinnamate Group Using a New Single UV–Exposure Method, SID 97 Digest*, pp. 707–710.

F. Yamada, et al., *LP–J: Late–News Poster: A New Photo–Alignment Scheme for LC–Cell Pretilt Control, SID 97 Digest*, pp. 715–718.

A. Lien, et al., *S23–5 UV–Type Two–Domain Wide Viewing Angle TFT/LCD Panels, Asia Display 95*, pp. 593–596.

Lim, et al., *Tilting of Liquid Crystal through Interaction with Methyl Orange Molecules Oriented by Circularly Polarized Light, JP Journal of Applied Physics*, vol. 35, No. 10 (1996), pp. 1281–1283.

Eugene Hecht, *Optics*, 1987, pp. 298–299.

Jenkins, et al., *Fundamentals of Optics*, McGraw–Hill Book Company, $3^{rd}$ Edition, 1957, pp. 492–493.

M.S. Nam, et al., *38–2: Wide–Viewing–Angle TFT–LCD with Photo–Aligned Four–Domain TN Mode, SID 97 Digest*, pp. 933–936.

Y. Iimura, et al., *44.1: Invited Address: Electro–Optic Characteristics of Amorphous and Super–Multidomain TN–LCDs Prepared by a Non–Rubbing Method, SID 94 Digest*, pp. 915–918.

* cited by examiner-

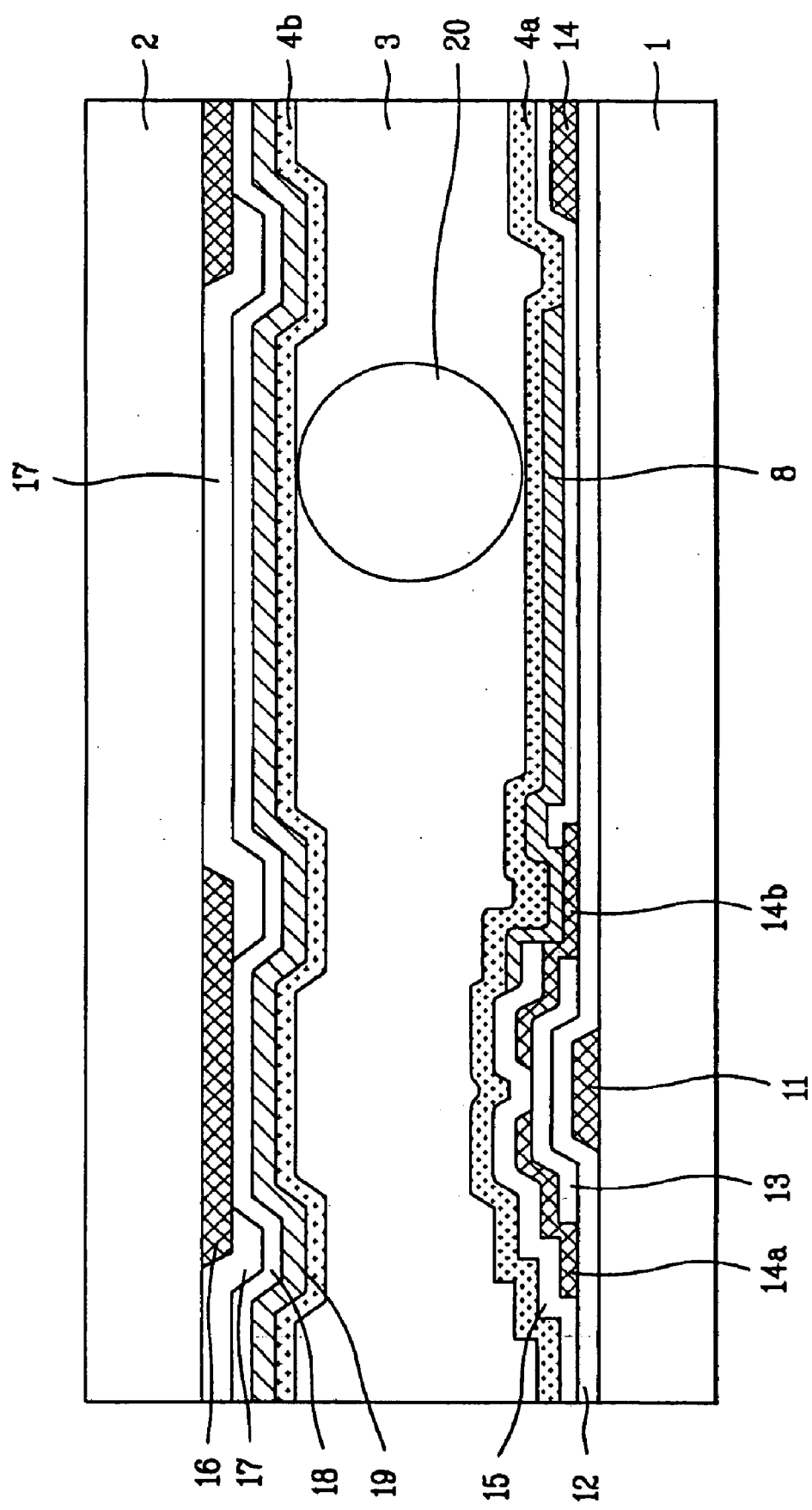

PHOTOALIGNMENT MATERIALS AND LIQUID CRYSTAL DISPLAY DEVICE AND METHOD FOR FABRICATING THE SAME WITH SAID MATERIALS

This application claims the benefit of Korean Patent Application No. 2000-63685 filed on Oct. 28, 2000, which is hereby incorporated by reference as if fully set forth herein.

BACKGROUND OF THE INVENTION

1. Field of the Invention

The present invention relates to photoalignment materials and to their use in liquid crystal displays.

2. Discussion of the Related Art

There is significant interest in liquid crystal displays because of their lightweight and low power consumption. A liquid crystal display includes a liquid crystal panel that is formed by aligning two prepared substrates at a constant interval and then injecting a liquid crystal between them. To produce a high quality image a liquid crystal display requires good light transmission, fast response time, wide viewing angle, and good contrast.

Because these requirements depend on the alignment characteristics of the liquid crystal molecules used in the display, good alignment characteristics are important. Unfortunately, good alignment is not accomplished by simply injecting a liquid crystal between substrates. In practice an alignment film is required on at least one of the substrates. Such an alignment film should have an anisotropic structure similar to that of the liquid crystal molecules.

Polyimide resin alignment films are typically used because they have good heat resistance and an affinity for various liquid crystals. A polyimide alignment film is usually prepared by printing polyamic acid on a substrate, drying that acid, and performing an imidization process. Then, the polyimide alignment film is rubbed to induce the desired anisotropic property.

The rubbing process generally involves inducing a directional alignment by directly rubbing the alignment film with a specifically manufactured cloth. This rubbing process is widely used for manufacturing liquid crystal displays because rubbing is simple and easy to perform.

Unfortunately, rubbing is not appropriate for inducing regular alignment over a large area as various rubbing parameters are difficult to control. Furthermore, a rubbed alignment film can be contaminated by fine particles and fibers produced by rubbing. Additionally, thin film transistors that are used in liquid crystal displays as switching element can be damaged by static electricity generated by rubbing. These problems can result in a defective or low quality liquid crystal display.

Because of the problems with rubbing, non-contact alignment methods are being developed. Those new methods include the Langmuir-Blodgett method, the fine image formation method, the MOLCA (Magnetically Oriented Liquid Crystalline Adsorption) method, and the photoalignment method.

The photoalignment method in particular has drawn significant attention because it potentially can result in a low cost, simple way of producing polymer alignment surfaces in a way that is suitable for mass production. Photoalignment uses light (typically ultraviolet or polarized ultraviolet) to produce an alignment layer. Additionally, Furthermore, the photoalignment method might also be able to improve viewing angle by forming multi-domain.

Photoalignment produced alignment films should be made of materials that are sensitive to a particular set of wavelengths that are appropriate for chemical and physical reactions. Reported photoalignment materials include polyvinylcinnamate and polyazobenzene. Those materials are known to form photosenstive polymers that can induce liquid crystal alignment.

However, prior art photoalignment materials have problems with establishing a desired pretilt angle and with thermal stability. Because prior art photoalignment materials can produce only very low pretilt it is difficult or impossible to get a desired pretilt angle. Furthermore, thermal stability is a problem because an alignment film's stability is severely dependent on the thermal stability of the polymers per se. Prior art photoalignment materials having glass transition temperatures below 100° C. are simply not appropriate.

Although attempts have been made to address the foregoing problems of prior art photoalignment materials, successful photoalignment materials were not achieved in the prior art.

SUMMARY OF THE INVENTION

Therefore, an object of the present invention is to provide a new photoalignment material.

Another object of the present invention is to provide a photoalignment material comprised of a diamine derivative with side branches, and which shows marked absorption of ultraviolet rays having 250–400 nm wavelengths.

Another object of the present invention is to provide a photoalignment material that has good photoalignment properties by using a diamine derivative as a main chain, and that increases pretilt angle by having side branches.

Still another object of the present invention is to provide a liquid crystal display device that can provide improved viewing angles by using an alignment film formed by a photoalignment material.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The above objects, features and advantages of the present invention will become more apparent from the following detailed description when taken in conjunction with the accompanying drawing, FIG. 1, which shows a cross-sectional view of a liquid crystal display.

DETAILED DESCRIPTION OF THE PREFERRED EMBODIMENT

A preferred embodiment of the present invention will be described with reference to the accompanying drawing. Matters in the description, such as a detailed construction and elements of a circuit, are provided to assist in a comprehensive understanding of the invention. Also, well-known functions or constructions are not described in detail since they could obscure the invention.

The present invention provides a photosensitive diamine derivative compound having side-branches. That compound is illustrated in Chemical Formula 1.

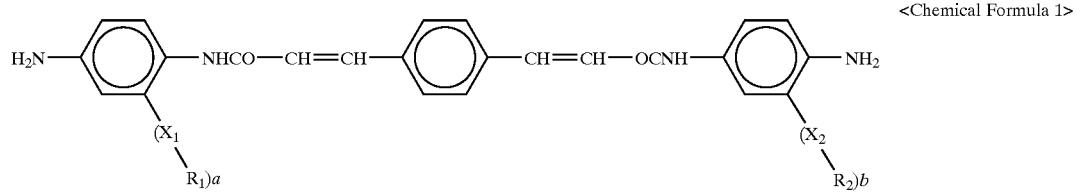

<Chemical Formula 1> where subscripts a and b are integral numbers from 0 to 4; components $X_1$ and $X_2$ are selected from the group comprising —$CH_2$—, —CH=, —O—, —COO—, —OOC—, —NHCO—, and -CONH—, respectively; and components $R_1$ and $R_2$ are functional groups selected from the group comprising hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, halo aryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl.

Another aspect of the present invention provides a photoalignment material, which comprises two compounds: polyamideimide, which is illustrated in Chemical Formula 2, containing the diamine derivative compound of Chemical Formula 1, and a polyamideimide precursor, which is illustrated in Chemical Formula 3.

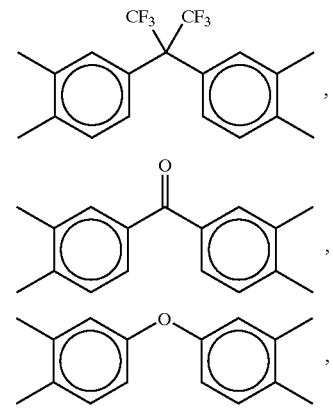

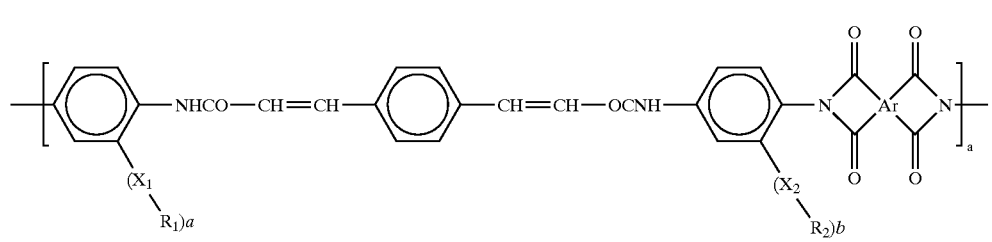

<Chemical Formula 2>

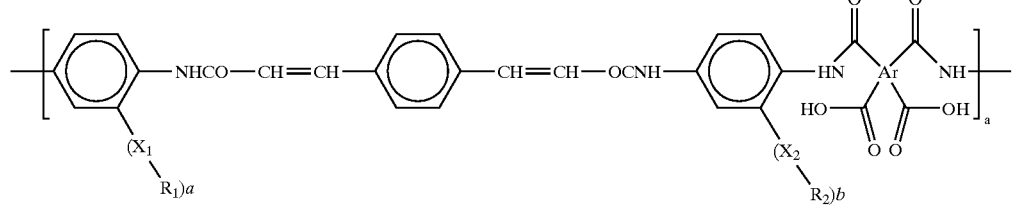

<Chemical Formula 3> where subscripts a and b are integral numbers from 0 to 4; components $X_1$ and $X_2$ are selected from the group comprising —$CH_2$—, —CH=, —O—, —COO—, —OOC—, —NHCO—, and —CONH—, respectively; and components $R_1$ and $R_2$ are functional groups selected from the group comprising hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl; and, Ar is selected from the group comprising -continued

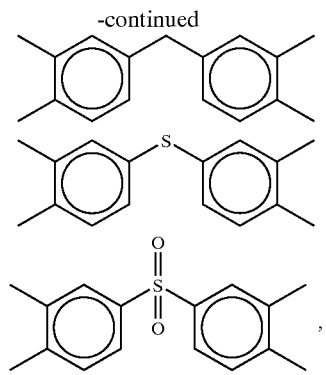

-continued

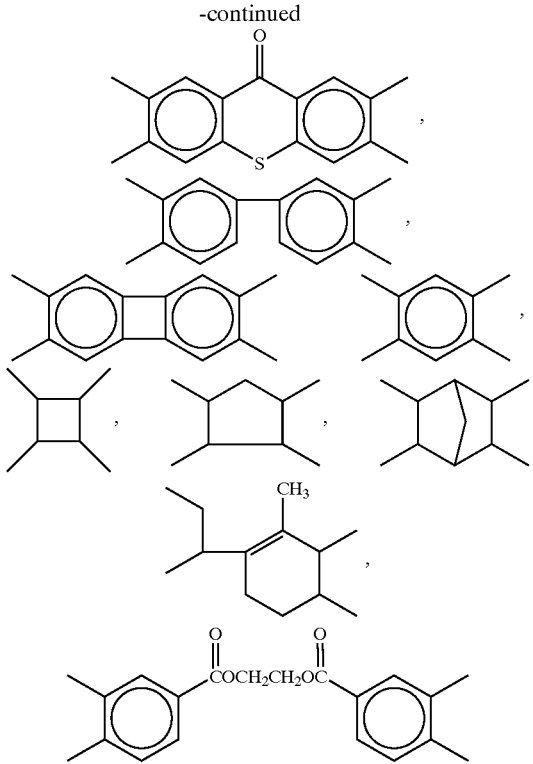

The molecular weight of the above exemplary compounds of Chemical formula 2 and 3, polyamideimide and a precursor of the same, is in a range from 1,000 to 1,000,000, respectively.

Still another aspect of the present invention provides an LCD, comprising a first substrate, a second substrate, a liquid crystal layer between the two substrates, and an alignment film on either the first substrate or on the second substrate, in which the alignment film includes a photoalignment material illustrated in Chemical Formula 2 or Chemical Formula 3.

The first substrate includes TFTs (Thin Film Transistors) which act as switching devices that respond to gate voltages. The second substrate is a color filter substrate having a color filter layer for displaying colors.

FIG. 1 is a cross-sectional view of an LCD that is in accord with the principles of the present invention. Referring now to FIG. 1, the LCD includes a first substrate 1, a second substrate 2, and a liquid crystal layer 3 between the first substrate 1 and the second substrate 2. A spacer 20 maintains a constant separation between the two substrates.

The first substrate 1 includes a gate line and a gate electrode 11, a gate insulating film 12 over the substrate and over the gate electrode 11, and a semiconductor layer 13 on the gate insulating film 12 and over the gate electrode 11. A data line 14 intersects the gate line. Furthermore, a source electrode 14a and a drain electrode 14b are disposed on the semiconductor layer 13. A first protective film 15 covers the foregoing structures, including the source and drain electrodes. A pixel electrode 8 extends over a pixel region. The pixel electrode is electrically connected to the drain electrode 14b. Furthermore, a first alignment film 4a extends over the foregoing structure, including over the pixel electrode 8.

The second substrate includes a black matrix 16 for reducing light leakage, a color filter layer 17 between openings in the black matrix 16, a second protective film 18 over the black matrix 16 and over the color filter layer 17, and a common electrode 19 on the second protective film 18. A second alignment film 4b extends over the common electrode 19.

At least, one of the alignment films (4a, 4b) should be a photoalignment film employing a photoalignment material as described above.

Another aspect of the present invention provides a photosensitive diamine derivative compounds with side-branches that are particularly reactive to a ultraviolet light between 250 nm and 400 nm, as illustrated in the Chemical Formula 4 and Chemical Formula 5, respectively.

<Chemical Formula 4>

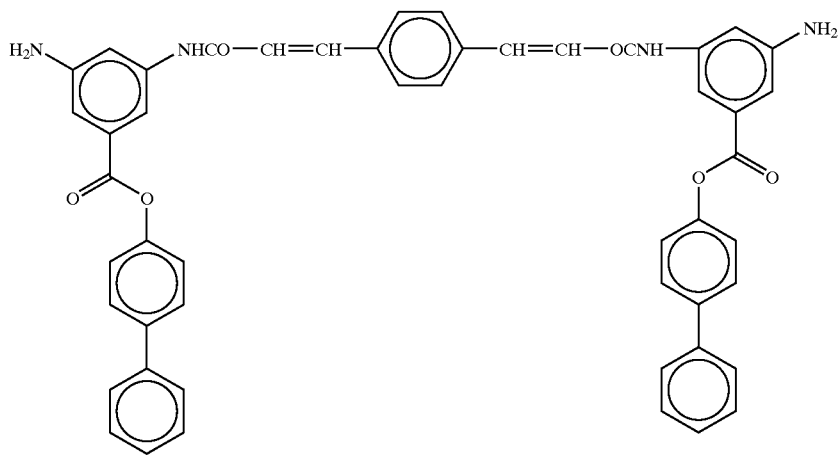

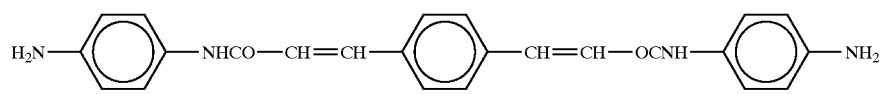

<Chemical Formula 5>

A preparation method of the diamine derivative compound illustrated in Chemical Formula 4 comprises dissolving 1 to 3 moles of 1,4-phenylene diacrylic acid and 2 to 8 moles of phenylene diamine in a mixed solvent of N-methyl pyrrolidinone and pyridine under a nitrogen atmosphere. Then, adding 1 to 5 moles of triphenyl phosphite to the solution and then stirring the resulting mixture for 1 to 10 hours at room temperature until the resultant is sufficiently mixed. Finally, raising the temperature to the range of 15° C. to 75° C. for 1 to 10 hours.

As for the diamine derivative compound illustrated in Chemical Formula 5, the above-described procedure for the compound of Chemical Formula 4 can be repeated, except that instead of phenyline diamine, phenyline diamine containing a biphenyl functional group through ester linkage is employed for a coupling reaction with 1,4-phenylene diacrylic acid.

Polyamideimide and a precursor thereof, which are illustrated in Chemical Formula 2 and Chemical Formula 3, are synthesized through a polymerization.

For example, when the diamine derivative compound of Chemical Formula 4 or Chemical Formula 5 and aromatic dianhydride are dissolved in N-methyl pyrrolidinone under a nitrogen atmosphere and reacted for 5 to 24 hours at a temperature between 0° C. to 50° C., a polyamideimide precursor of Chemical Formula 3 is obtained through polymerization. Moreover, by heating the precursor and allowing it to go through imidization, polyamideimide is obtained.

Another method for preparing a soluble polyamideimide precursor comprises dissolving a diaimine derivative compound of either Chemical Formula 4 or Chemical Formula 5 and 2,2-bis-(3,4-dicarboxyphenyl)hexafluorine biphenyl (6F) to the amount of approximately 10% by weight of a solvent N-methyl pyrrolidinone; adding isoquinoline as a catalyst for the reaction, heating the mixture at a temperature of 0° C. to 50° C. for 30 minutes; and stirring the resultant for 1 to 10 hours at a temperature between 150° C. to 250° C.

A polyamideimide thin film is prepared by spin coating the first substrate (or the second substrate) with the prepared polyamideimide precursor solution in the amount of 1 to 20% by weight, more preferably, 2 to 4% by weight, and then drying the substrate (beneficially on a hot plate) at a temperature between 50° C. to 100° C. for 30 minutes to 2 hours.

During spin coating the rotation speed of the spinner should be adjusted to yield a polyamideimide precursor thin film having a thickness of 0.1 to 20 micrometers.

After spin coating and drying, part of the solvent, N-methyl pyrrolidinone, that remains inside the polyamideimide precursor thin film can be removed by heating at 250° C. under nitrogen atmosphere, yielding polyamideimde.

In the foregoing description, the residual solvent after imidization was dried, and the resulting polymer was dense enough to prepare a polyamideimide thin film at a thickness of 0.05 to 10 micrometers.

Using the above-described photosensitive polyamideimide thin film, a method for manufacturing a liquid crystal cell will be explained.

To obtain a desired pretilt angle a double irradiation method can be used. According to that method a non-polarized light and a linearly polarized light are irradiated in turn. Using the double irradiation method, beneficially a 45° between an ultraviolet ray progressing plate and the thin film is maintained, and 0.25 J/cm² of non-polarized light and 1.5 J/cm² of linearly polarized light are irradiated in order.

Alternatively, a single irradiation method can be used, and the pretilt angle and the pretilt direction (alignment direction) can be obtained by exposing the single irradiation at the same time. In that method a UV light comprised of a non-polarized light, an unpolarized light, a partially polarized light, or a linearly polarized light can be used.

Photoalignment is beneficially performed after the liquid crystal cell is fabricated. First, sealing materials are located on a first substrate to form a seal. The second substrate is then located over the first substrate, with spacers between the substrates to accurately separate them. The separation is preferably 1 to 100 micrometers, and more preferably 2 to 20 micrometers. Then, a liquid crystal material is injected between the substrates via an opening in the seal. After injection, the seal is then completely sealed.

The liquid crystal material is beneficially a mixture of 4'-pentyl-4-bisphenylcarbonitril having the nematic liquid crystal structure and 1 wt. % of antiquinone pigment, Disperse Blue 1 ($\lambda_{max}$=607 nm). A positive or negative dielectric anisotropy liquid crystal is suggested, and a chiral dopant can be added.

Besides the conventional injection method it is also possible to form a liquid crystal layer using a dispensing method in which a liquid crystal is located on at least one substrate for bonding with other substrate.

The alignment of a liquid crystal cell can be measured according to the rotation angle of the liquid crystal using absorption of a linearly polarized He—Ne laser.

The present invention will now be described in more detail by referrance to the following examples.

First Embodiment

To synthesize a diamine derivative compound with a side branch in accordance with a first embodiment of the present invention, to 1,3-diamino benzoic acid is added an amount of thiol chloride. That mixture is reacted at 80° C. under a nitrogen atmosphere for five hours. 4-phenyl phenol is then added. Using tetrahydrofuran (THF) as a solvent and pyridine as a catalyst, the resulting compound is then reacted at room temperature under a nitrogen atmosphere for 24 hours.

To prepare a photosensitive diamine derivative compound with a side branch, into a solvent of N-methyl pyrrolidinone and pyridine at a mixing ratio of 4:1 by volume is dissolved 1 mole of 1,4-phenylene diacrylic acid, and 5 moles of the above-described diaminine derivative compound under a nitrogen atmosphere. 2 moles of triphenylphosphite is then added to the solution, which is stirred for 2 hours until the mixture is sufficiently aged. Then, the temperature is slowly raised to 100° C. and the reaction is continued for 5 more hours.

A precursor of photosensitive aromatic polyamideimide with a side branch can be obtained from a reaction of pyromellitic dianhydride (PMDA) and the above-described photosensitive diamine derivative compound. First, the synthesized photosensitive diamine derivative compound with a side branch is dissolved in N-methylpyrrolidinone in an amount of approximately 10% by weight of the solvent, and an equivalent amount of PMDA with the diamine derivative compound is slowly added. The mixture is then stirred for 2 days until the polymerization is complete, yielding a desired polyamideimide precursor.

Then, the above-described polyamideimide precursor solution can be spin coated on a first substrate and dried at 80° C. using a hot plate. After this polyamideimide precursor thin film is heated under a nitrogen atmosphere at 250° C. for two minutes a desired polyamideimide thin film results.

The double irradiation method or the single irradiation method described above can then be used to induce photoalignment on the polyamideimide thin film. The first substrate and the second substrate can be bonded together and a liquid crystal can be injected between the substrates to produce a liquid crystal cell.

When a liquid crystal cell according to the first embodiment was fabricated, the pretilt angle of its liquid crystal was measured in accordance with a crystal rotation method. The measured pretilt angle was approximately 29°.

Second Embodiment

To synthesize a diamine derivative compound with a side branch in accordance with a second embodiment of the present invention, to 1,3-diamino benzoic acid is added an amount of thiol chloride. The mixture is then reacted at 80° C. under a nitrogen atmosphere for five hours. 4-phenyl phenol is then added. Using tetrahydrofiran (THF) as a solvent and pyridine as a catalyst, the resulting compound is then reacted at room temperature under a nitrogen-atmosphere for 24 hours.

To prepare a photosensitive diamine derivative compound with a side branch, into a solvent of N-methyl pyrrolidinone and pyridine at a mixing ratio of 4:1 by volume is dissolved 1 mole of 1,4-phenylene diacrylic acid, and 5 moles of the above-described diaminine derivative compound under a nitrogen-atmosphere. 2 moles of triphenylphosphite is then added to the solution, which is then stirred for 2 hours until the mixture is sufficiently aged. Then, the temperature is slowly raised to 100° C. and the reaction continues for 5 more hours.

A precursor of photosensitive aromatic polyamideimide with a side branch is obtained from a reaction of 3,3',4,4'-biphenyl tetracarboxylic dianhydride (BPDA) and the above-described photosensitive diamine derivative compound. First, the synthesized photosensitive diamine derivative compound with a side branch is dissolved in N-methylpyrrolidinone in an amount of approximately 10% by weight of the solvent, and an equivalent amount of 3,3',4,4'-BPDA with the diamine derivative compound is slowly added. The mixture is then stirred for 2 days until the polymerization is complete, yielding a desired polyamideimide precursor.

Then, the above-described polyamideimide precursor solution can be spin coated on a first substrate and dried at 80° C. using a hot plate. When this polyamideimide precursor thin film is heated under a nitrogen atmosphere at 250° C. for two minutes a desired polyamideimide thin film results.

The previously described double irradiation method or single irradiation method can them be used to induce photoalignment on the polyamideimide thin film. The first substrate and the second substrate can be bonded together and a liquid crystal can be injected between those substrates to produce a liquid crystal cell.

When a liquid crystal cell was fabricated according to the second embodiment, a pretilt angle of its liquid crystal was measured in accordance with a crystal rotation method. The measured pretilt angle was approximately 9.5°.

Third Embodiment

To synthesize a diamine derivative compound with a side branch in accordance with a third embodiment of the present invention, to 1,3-diamino benzoic acid is added an equivalent amount of thiol chloride. The mixture is then reacted at 80° C. under a nitrogen atmosphere for five hours. 4-phenyl phenol is then added. Using tetrahydrofuran (THF) as a solvent and pyridine as a catalyst, the resulting compound is then reacted at room temperature under a nitrogen atmosphere for 24 hours.

To prepare a photosensitive diamine derivative compound with a side branch, into a solvent of N-methyl pyrrolidinone and pyridine at a mixing ratio of 4:1 by volume is dissolved 1 mole of 1,4-phenylene diacrylic acid, and 5 moles of the above-described diaminine derivative compound under a nitrogen atmosphere. 2 moles of triphenylphosphite is then added to the solution, which is then stirred for 2 hours until the mixture is sufficiently aged. Then, the temperature is slowly raised to 100° C. and the reaction continued for 5 more hours.

A precursor of photosensitive aromatic polyamideimide with a side branch can be obtained from a reaction of 4,4'-oxydiphthalic anhydride (ODPA) and the above-described photosensitive diamine derivative compound. First, the synthesized photosensitive diamine derivative compound with a side branch is dissolved in N-methylpyrrolidinone in an amount of approximately 10% by weight of the solvent, and an equivalent 4,4'-ODPA with the diamine derivative compound is slowly added. The mixture is then stirred for 2 days until the polymerization is completed, yielding a desired polyamideimide precursor.

The above-described polyamideimide precursor solution can then be spin coated on a first substrate and dried at 80° C. using a hot plate. When this polyamideimide precursor thin film is heated under a nitrogen atmosphere at 250° C. for two minutes a desired polyamideimide thin film results.

The previously described double irradiation method or single irradiation method can be used to induce photoalignment of the polyamideimide thin film.

The first substrate and the second substrate can be bonded together, and a liquid crystal can be injected between those substrates to produce a liquid crystal cell.

When a liquid crystal cell was fabricated according to the third embodiment, a pretilt angle of its liquid crystal was measured in accordance with a crystal rotation method. The measured pretilt angle was approximately 7.8°.

Fourth Embodiment

To synthesize a diamine derivative compound with a side branch in accordance with a fourth embodiment of the present invention, to 1,3-diamino benzoic acid is added an amount of thiol chloride. That mixture is then reacted at 80° C. under a nitrogen-atmosphere for five hours. 4-phenyl phenol is then added. Using tetrahydrofuran (THF) as a solvent and pyridine as a catalyst, the resulting compound is then reacted at room temperature under a nitrogen atmosphere for 24 hours.

To prepare a photosensitive diamine derivative compound with a side branch, into a solvent of N-methyl pyrrolidinone and pyridine at a mixing ratio of 4:1 by volume is dissolved 1 mole of 1,4-phenylene diacrylic acid, and 5 moles of the above-described diaminine derivative compound under a nitrogen-atmosphere. 2 moles of triphenylphosphite is then added to the solution, which is then stirred for 2 hours until the mixture is sufficiently aged. Then, the temperature is slowly raised to 100° C. and the reaction continued for 5 more hours.

A precursor of photosensitive aromatic polyamideimide with a side branch can be obtained from a reaction of 3,4-dicarboxyphenyl hexafluoropropane dianhydride (6FDA) and the above-described photosensitive diamine derivative compound. First, the synthesized photosensitive diamine derivative compound with a side branch is dissolved in N-methylpyrrolidinone in an amount of approximately 10% by weight of the solvent, and an equivalent amount of 3,4-dicarboxyphenyl 6FDA with the diamine derivative compound is slowly added. The mixture is then stirred for 2 days until the polymerization is complete, yielding a desired polyamideimide precursor.

The above-described polyamideimide precursor solution can be spin coated on a first substrate and dried at 80° C. using a hot plate. When this polyamideimide precursor thin film is heated under a nitrogen atmosphere up to 250° C. for two minutes a desired polyamideimide thin film results.

The previously described double irradiation method or single irradiation method can be used to induce photoalignment of the polyamideimide thin film.

The first substrate and the second substrate can be bonded together and a liquid crystal can be injected between the substrates to produce a liquid crystal cell. When a liquid crystal cell was fabricated according to the fourth embodiment, a pretilt angle of its liquid crystal was measured in accordance with a crystal rotation method. The measured pretilt angle was approximately 8.4°.

Fifth Embodiment

To synthesize a diamine derivative compound with a side branch in accordance with a fifth embodiment of the present invention, to 1,3-diamino benzoic acid is add an amount of thiol chloride. That mixture is then reacted at 80° C. under a nitrogen-atmosphere for five hours. Then 4-phenyl phenol is added. Using tetrahydrofuran (THF) as a solvent and pyridine as a catalyst, react the resulting compound at room temperature under a nitrogen atmosphere for 24 hours.

To prepare a photosensitive diamine derivative compound with a side branch, into a solvent of N-methyl pyrrolidinone and pyridine at a mixing ratio of 4:1 by volume dissolve 1 mole of 1,4-phenylene diacrylic acid and 5 moles of the above-described diaminine derivative compound under a nitrogen atmosphere. Then add 2 moles of triphenylphosphite to the solution and stir for 2 hours until the mixture is sufficiently aged. Then, slowly raise the temperature to 100° C. and continue the reaction for 5 more hours.

A soluble photosensitive aromatic polyamideimide with a side branch can be obtained from a reaction of 3,4-dicarboxyphenyl hexafluoropropane dianhydride (6FDA) and the above-described photosensitive diamine derivative compound. First, dissolve the synthesized photosensitive diamine derivative compound with a side branch and an equivalent amount of 3,4-dicarboxyphenyl 6FDA with the diamine derivative compound in N-methylpyrrolidinone, in an amount of 10% by weight of the solvent. Using isoquinoline as a catalyst, heat the mixture at 70° C. for 30 minutes and then stir the mixture at 220° C. for 3 hours.

Then, place the above-described polyamideimide polymer solution in methanol. Note, the dropped solution violently reacts with methanol to yield a solid polyamideimide. Further, apply a cyclohexanone solution in an amount of 2% by weight of the photosensitive polyamideimide. Apply the result to a first substrate, spin coat, and dry at 80° C. using a hot plate. The density of the resulting polymer can be increased by heating the substrate to 200° C. under vacuum. Residual solvent on the substrate is evacuated and the polymer becomes more dense.

The previously described double irradiation method or single irradiation method can then used to induce photoalignment of the polyamideimide thin film.

The first substrate and the second substrate can be bonded together and a liquid crystal can be injected between the substrates to produce a liquid crystal cell.

When a liquid crystal cell was fabricated according to the fifth embodiment, a pretilt angle of its liquid crystal was measured in accordance with a crystal rotation method. The measured pretilt angle was approximately 8.5°.

Sixth Embodiment

To synthesize a photosensitive diamine derivative compound without a side branch in accordance with a sixth embodiment of the present invention, into a solvent of N-methyl pyrrolidinone and pyridine mixed at a ratio of 4:1 by volume dissolve 1 mole of 1,4-phenylene diacrylic acid and 5 moles of the above-described side branch free-diamine derivative compound with a photosensitive functional group under a nitrogen atmosphere. Add 2 moles of triphenylphosphite to the solution and stir for 2 hours until the mixture is sufficiently aged. Then, raise the temperature of the solution to 100° C. and continue the reaction for 5 more hours.

A precursor of photosensitive aromatic polyamideimide without a side branch can be obtained from a reaction of 3,4-dicarboxyphenyl hexafluoropropane dianhydride (6FDA) and the above-described photosensitive diamine derivative compound. First, the synthesized photosensitive diamine derivative compound without a side branch is dissolved in N-methylpyrrolidinone in an amount of approximately 10% by weight of the solvent, and an equivalent amount of 3,4-dicarboxyphenyl 6FDA with the diamine derivative compound is slowly added. The mixture is then stirred for 2 days until the polymerization is complete, yielding a desired polyamideimide precursor.

Then, the above-described polyamideimide precursor solution can be located on a first substrate, spin coated, and dried at 80° C. using a hot plate. When this polyamideimide precurosr thin film is heated under a nitrogen-atmosphere at 250° C. for two minutes a polyamideimide thin film results.

The previously described double irradiation method or single irradiation method is then used to induce photoalignment of the polyamideimide thin film.

The first substrate and the second substrate can be bonded together and a liquid crystal can be injected between the substrates to produce a liquid crystal cell.

When a liquid crystal cell was fabricated according to the sixth embodiment, a pretilt angle of its liquid crystal was measured in accordance with a crystal rotation method. The measured pretilt angle was approximately 0.6°.

After comparing embodiments 1 through 5 with the sixth embodiment, the advantages of the side branches becomes apparent.

A photoalignment film according to the principles of the present invention can be applied to one substrate or both substrates. If applied to one substrate a conventional rubbed alignment film can be formed on the other.

A photoalignment film according to the principles of the present invention can be used with different liquid crystal modes, including TN (twisted nematic), STN (super twisted nematic), IPS (in-plane switching), OCB (optically controlled birefringence), VA (vertical alignment), FLC (ferroelectric liquid crystal), AFLC (anti-ferroelectric liquid crystal), and PDLC (polymer dispersed liquid crystal display).

The present invention provides for photoalignment materials that include photosensitive diamine derivative compounds with side branches in a main chain. It further provides for liquid crystal display devices using such a photoalignment material. Such photoalignment materials can improve the liquid crystal alignment and pretilt angle characteristics of liquid crystal display devices. This can improve the viewing angle.

While the invention has been shown and described with reference to certain embodiments thereof, it will be understood by those skilled in the art that various changes in form and details may be made therein without departing from the spirit and scope of the invention as defined by the appended claims.

What is claimed is:

1. A photoalignment layer for the alignment of liquid crystal, comprising polyamideimide according to Chemical Formula 2 and a polyamideimide precursor according to Chemical Formula 3, wherein a photosensitive diamine derivative compound with a side chain is connected to a main chain, respectively;

<Chemical Formula 2>

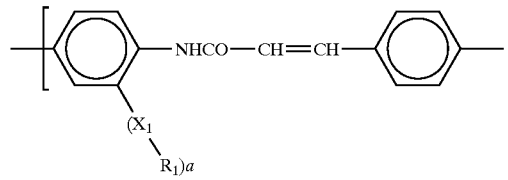

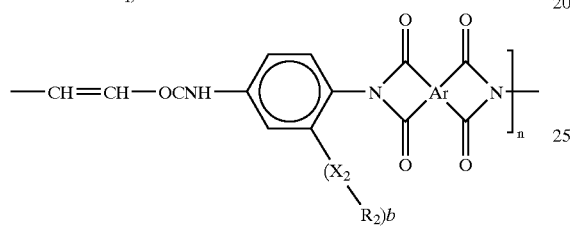

<Chemical Formula 3>

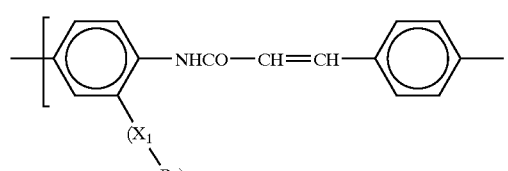

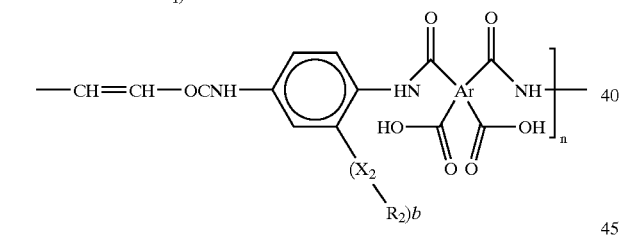

where subscripts a and b are integral numbers from 1 to 4; components $X_1$ and $X_2$ are selected from a group comprising —$CH_2$—, —CH=, —O—, —COO—, —OOC—, —NHCO—, and —CONH—; and components $R_1$ and $R_2$ are functional groups selected from a group comprising hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl; and Ar is selected from the group comprising:

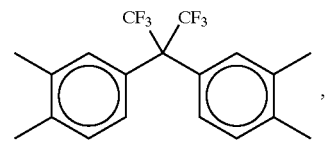

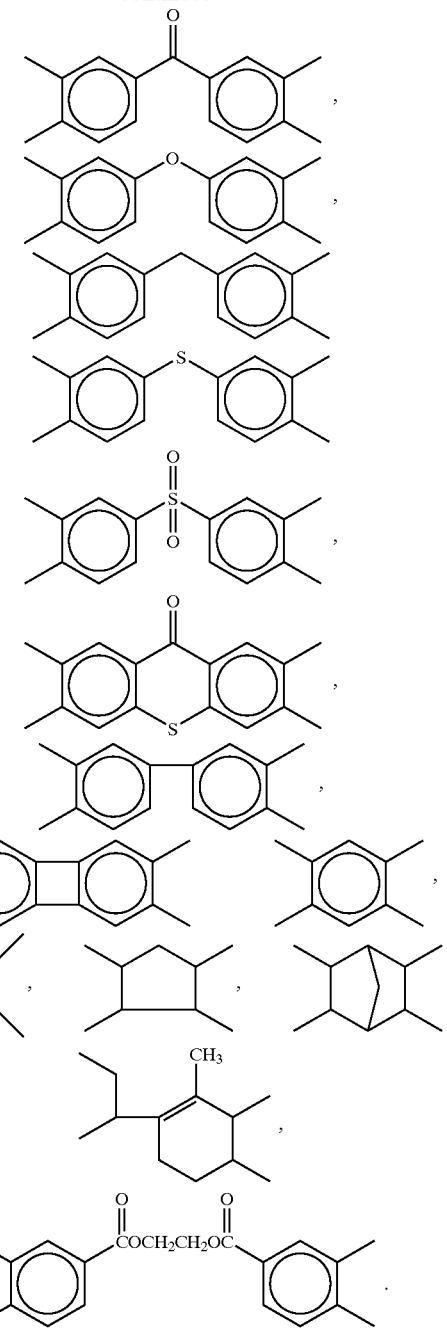

2. The photoalignment material of claim 1, wherein a molecular weight of the polyamideimide of Chemical Formula 2 and the polyamideimide precursor of Chemical Formula 3 is in a range from 1,000 to 1,000,000.

3. A liquid crystal display device, comprising:
   a first substrate;
   a second substrate;
   a liquid crystal layer between the first substrate and the second substrate; and
   an alignment film having a photoalignment material on the first substrate,
   wherein the photoalignment material has Chemical Formula 2;

<Chemical Formula 2>

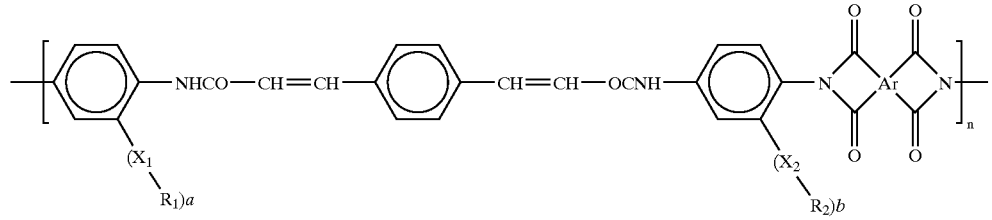

where subscripts a and b are integral numbers from 1 to 4; components $X_1$ and $X_2$ are selected from a group comprising —$CH_2$—, —CH=, —O—, —COO—, —OOC—, —NHCO—, and —CONH—; and components $R_1$ and $R_2$ are functional groups selected from a group comprising hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl; and Ar is selected from the group comprising:

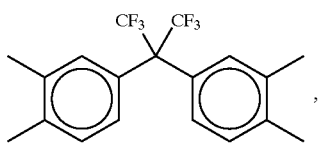

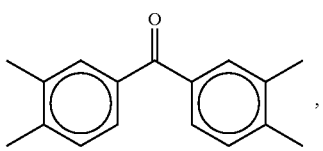

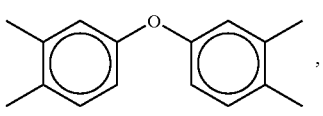

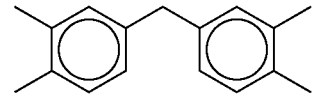

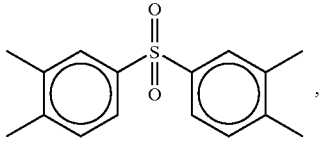

-continued

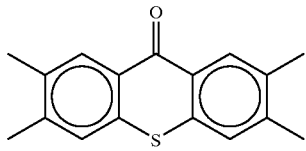

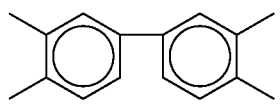

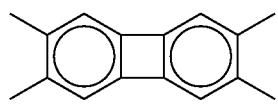, 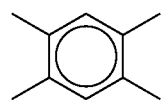

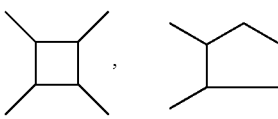, 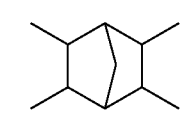

4. The device of claim 3, wherein the first substrate includes a thin film transistor comprising a gate electrode, a gate insulating film, a semiconductor layer, and a source/drain electrode.

5. The device of claim 3, wherein the alignment film is treated by a photoalignment process.

6. The device of claim 3, wherein the second substrate includes a rubbed alignment material.

7. A liquid crystal display device, comprising:
   a first substrate;
   a second substrate;
   a liquid crystal layer between the first substrate and the second substrate; and
   an alignment film having a photoalignment material on the first substrate,
   wherein the photoalignment material has a Chemical Formula 3;

<Chemical Formula 3>

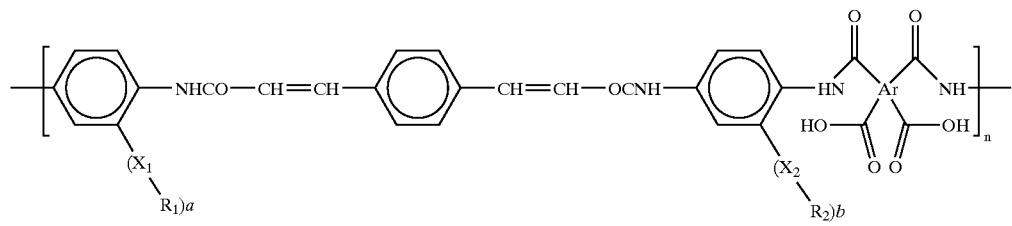

where subscripts a and b are integral numbers from 1 to 4; components $X_1$ and $X_2$ are selected from a group comprising —$CH_2$—, —CH=, —O—, —COO—, —OOC—, —NHCO—, and —CONH—; and components $R_1$ and $R_2$ are functional groups selected from a group comprising hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl; and Ar is selected from the group comprising:

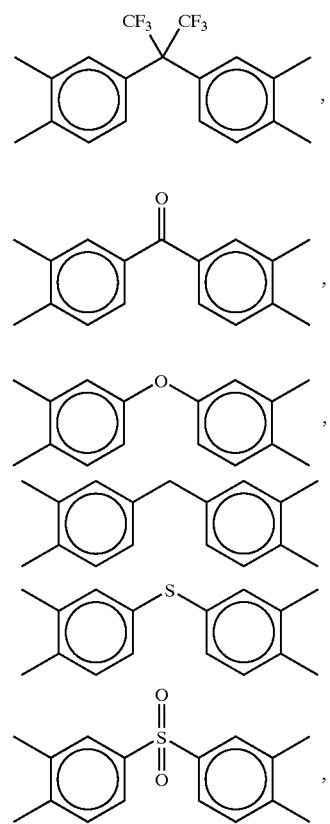

-continued

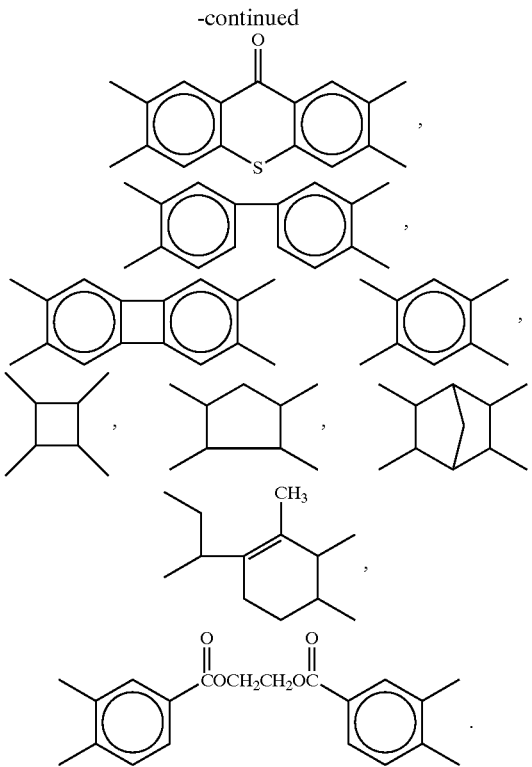

8. The device of claim 7, wherein the first substrate comprises a thin film transistor having a gate electrode, a gate insulating film, a semiconductor layer, and a source/drain electrode.

9. The device of claim 7, wherein the alignment film is treated by a photoalignment process.

10. The device of claim 7, wherein the second substrate includes a rubbed alignment material.

11. A method for fabricating a liquid crystal display device, comprising:

preparing a first substrate and a second substrate;

forming an alignment film having a photoalignment material according to Chemical Formula 2 on the first substrate; and locating a liquid crystal layer between the first substrate and the second substrate,

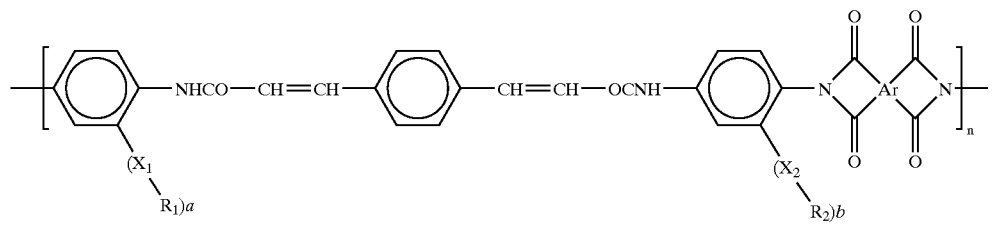

where subscripts a and b are integral numbers from 1 to 4; components $X_1$ and $X_2$ are selected from a group comprising —$CH_2$—, —CH=, —O—, —COO—, —OOC—, —NHCO—, and —CONH—; and components $R_1$ and $R_2$ are functional groups selected from a group comprising hydrogen, halogen, cyano, nitro, amino, alkyl ($C_1$–$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$–$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl; and Ar is selected from the group comprising:

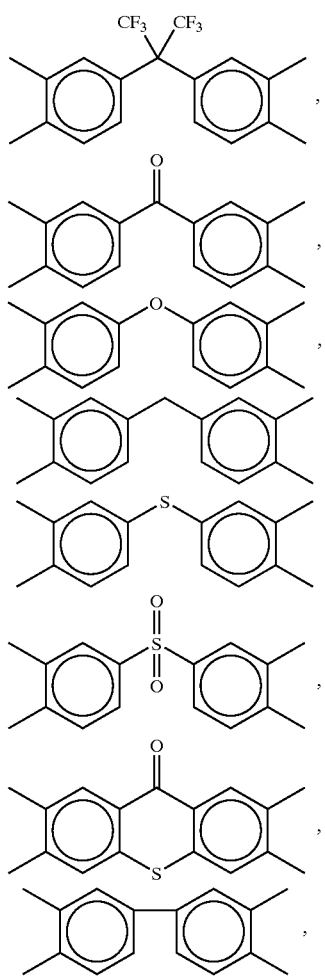

-continued

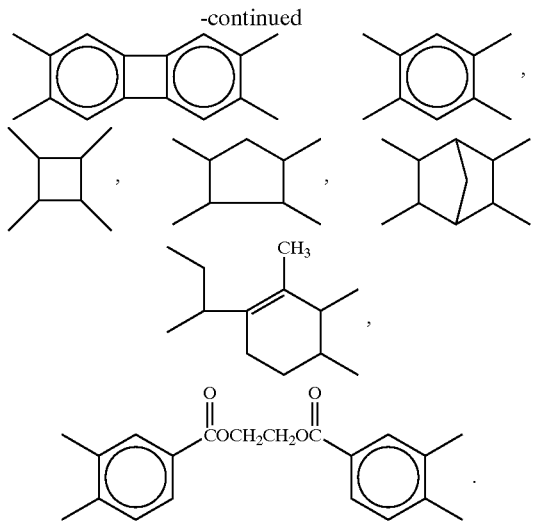

12. The method of claim 11, further comprising:

forming a gate line and a crossing data line on the first substrate;

forming a thin film transistor at the crossing; and forming a pixel electrode that is connected to the thin film transistor.

13. The method of claim 11, further comprising the step of irradiating light on the alignment film.

14. The method of claim 13, wherein the irradiating light is selected from a group consisting of unpolarized light, non-polarized light, linearly polarized light, and partially polarized light.

15. The method of claim 11, wherein the second substrate includes a rubbed alignment material.

16. The method of claim 15, wherein the rubbed alignment material is selected from a group consisting of polyimide, polyamide, polyamic acid and $SiO_2$.

17. The method of claim 15, wherein the rubbed alignment material is rubbed by rubbing-roll.

18. A method for fabricating a liquid crystal display device comprising:

preparing a first substrate and a second substrate;

forming an alignment film having a photoalignment material according to in Chemical Formula 3 on the first substrate; and interposing a liquid crystal between the first substrate and the second substrate,

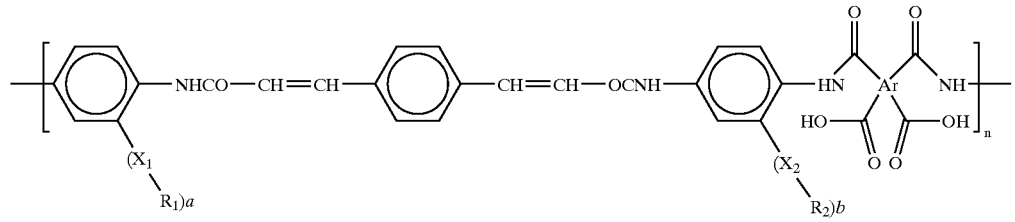

where subscripts a and b are integral numbers from 1 to 4; components $X_1$ and $X_2$ are selected from a group comprising —$CH_2$—, —CH=, —O—, —COO—, —OOC—, —NHCO—, and —CONH—; and components $R_1$ and $R_2$ are functional groups selected from the group comprising hydrogen, halogen, cyano, nitro, amino, alkyl ($C_1$-$C_{100}$), haloalkyl, cyanoalkyl, nitroalkyl, hydroxyalkyl, cyanohaloalkyl, nitrohaloalkyl, cyanonitroalkyl, hydroxyhaloalkyl, cyanohydroxyalkyl, hydroxynitroalkyl, aryl ($C_6$-$C_{100}$), alkylaryl, haloaryl, haloalkylaryl, nitroaryl, nitroalkylaryl, cyanoaryl, cyanoalkylaryl, nitroaryl, nitroalkylaryl, hydroxyaryl, hydroxyalkylaryl, cyanohaloaryl, and cyanohaloalkylaryl; and, Ar is selected from the group comprising:

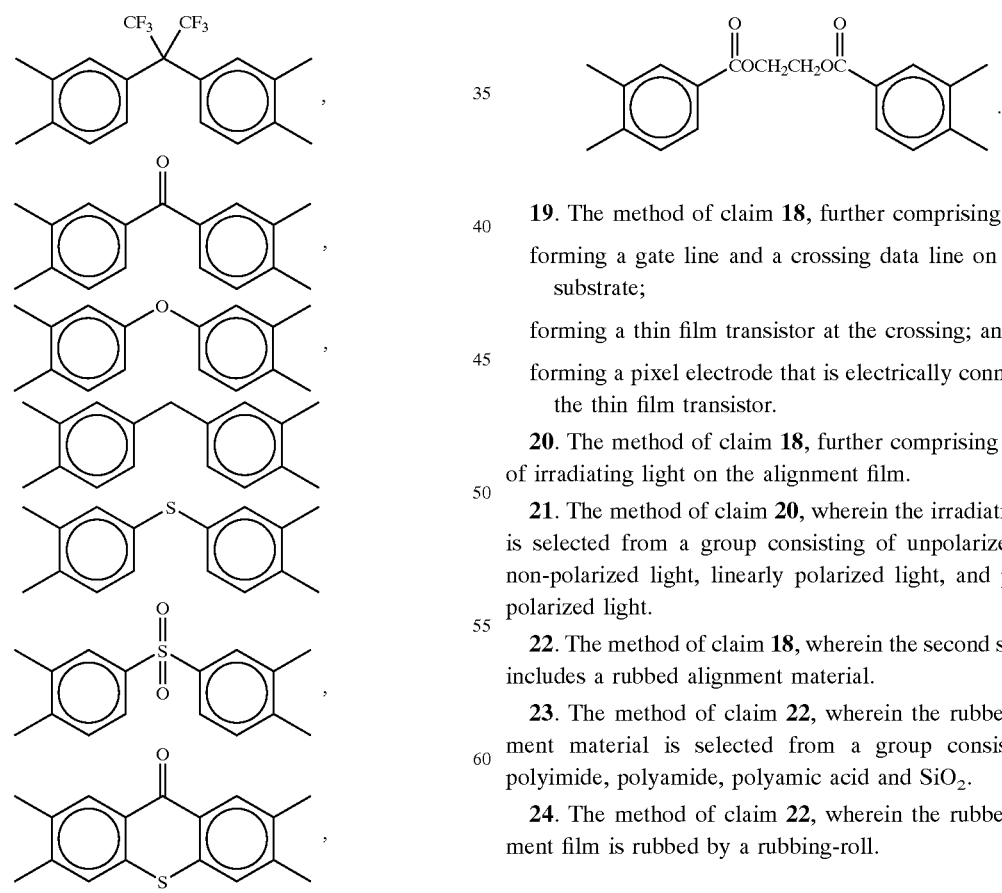

19. The method of claim 18, further comprising:

forming a gate line and a crossing data line on the first substrate;

forming a thin film transistor at the crossing; and forming a pixel electrode that is electrically connected to the thin film transistor.

20. The method of claim 18, further comprising the step of irradiating light on the alignment film.

21. The method of claim 20, wherein the irradiating light is selected from a group consisting of unpolarized light, non-polarized light, linearly polarized light, and partially polarized light.

22. The method of claim 18, wherein the second substrate includes a rubbed alignment material.

23. The method of claim 22, wherein the rubbed alignment material is selected from a group consisting of polyimide, polyamide, polyamic acid and $SiO_2$.

24. The method of claim 22, wherein the rubbed alignment film is rubbed by a rubbing-roll.

* * * * *